Figure 1:
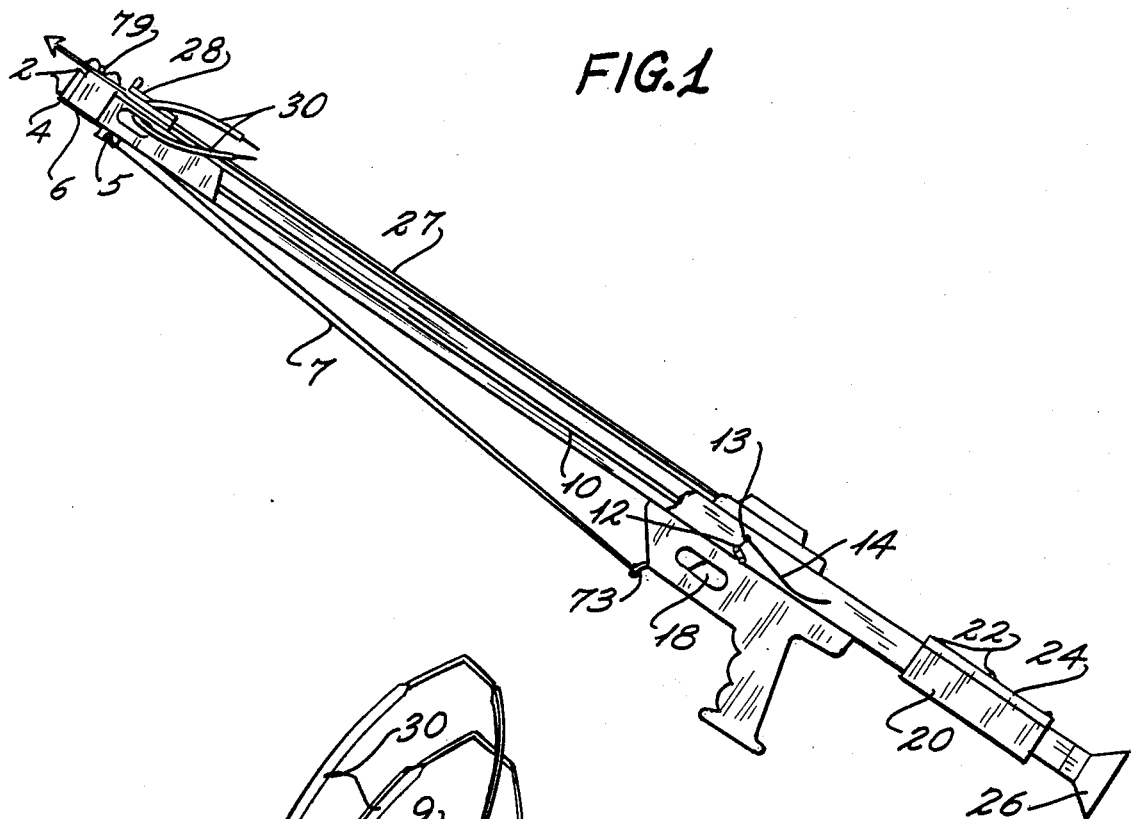

United States Patent [19]

Frain et al.

[11] Patent Number: 4,894,940

[45] Date of Patent: Jan. 23, 1990

[54] LIGHT PROJECTING SPEARGUN

[76] Inventors: Patrick Frain; Denise Frain, both of 628 SE. 5th St., Delray Beach, Fla. 33483

[21] Appl. No.: 317,556

[22] Filed: Mar. 1, 1989

[51] Int. Cl.$^4$ ............................ F41B 5/08; F41G 1/34
[52] U.S. Cl. ........................................ 42/103; 42/1.14; 362/110
[58] Field of Search .................... 42/103, 1.14; 124/22, 124/35 R; 362/110–114; 43/6

[56] References Cited

U.S. PATENT DOCUMENTS

| | | | |
|---|---|---|---|
| 4,055,000 | 10/1977 | Cesin | 33/241 |
| 4,429,350 | 1/1984 | Guthrie | 362/109 |
| 4,759,336 | 7/1988 | Frain | 124/22 |

Primary Examiner—Charles T. Jordan
Assistant Examiner—Michael Carone

[57] ABSTRACT

An improvement in spearguns. A light is incorporated inside the speargun barrel to improve the field of sight for the spearfisherman. The light focuses on the area the spear is aiming at without interferring with the shot or increasing the drag through the water. The controls for the light are in close proximity to the trigger mechanism so it is easy to use. Despite being housed in the speargun barrel, the components are easy to service such as replacing the bulb or batteries.

6 Claims, 2 Drawing Sheets

LIGHT PROJECTING SPEARGUN

This invention relates to spearguns, more particularly to a light projecting speargun.

Heretofore, spearguns wers limited in their use in dark, murky areas. This invention enables the user the convenience of lighting the area up for a better sight of field. Previously divers used a separate underwater flashlight. This was too awkward. The diver had to balance a speargun and a separate flashlight. Even if the diver attached a separate flashlight to his speargun, it still was awkward to use. He still had to reach up to the flashlight and turn it on and off. Also the flashlight was beaming off center from where the spear was shooting out of the gun at. With our invention, the diver can illiminate the area around him with a flick of his finger. The area of illumination is directly within the shooting area due to the positioning of the light. The light is streaming from the tip of the speargun where it is needed.

Accordingly, several objects and advantages of this invention are its compact size and weight. The light is contained within the speargun barrel. It is barely noticeable. It has less drag through the water. It is also very easy to use. The switch is located near the hand grip so the user is not fumbling to get to the switch. The switch can be depressed while gripping the speargun and ready to pull the trigger to shoot.

The light assembly is durably made to withstand the abuse diver's equipment is subjected to. A further advantage is the convenience of having a light ready to use when you need it. It is advantageous that this light system is reliable. There is no forgetting to turn the light off. As soon as the user takes his hand off the switch, the light goes off.

The light assembly barely projects out of the speargun barrel. All the other components are housed within the speargun barrel. Despite being housed within the speargun barrel, the components are easy to get to. Therefore, changing batteries or the bulb is an easy task.

Another advantage is that the light is quiet. Its magnetic switch is silient. Fish won't get "spooked". It is advantageous to use this light projecting speargun as it improves the field of sight of the diver. The diver can see clearer in poor visibility areas.

Readers will find further objects and advantages of this invention from the following description and drawings.

Figure 2:
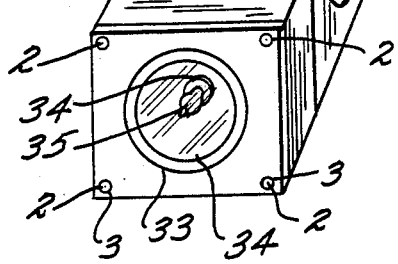
Figure 3:
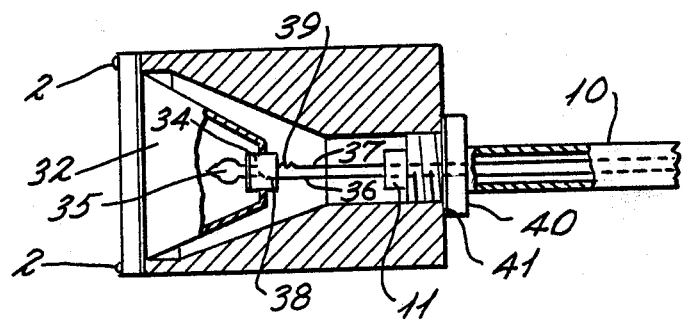
Figure 4:
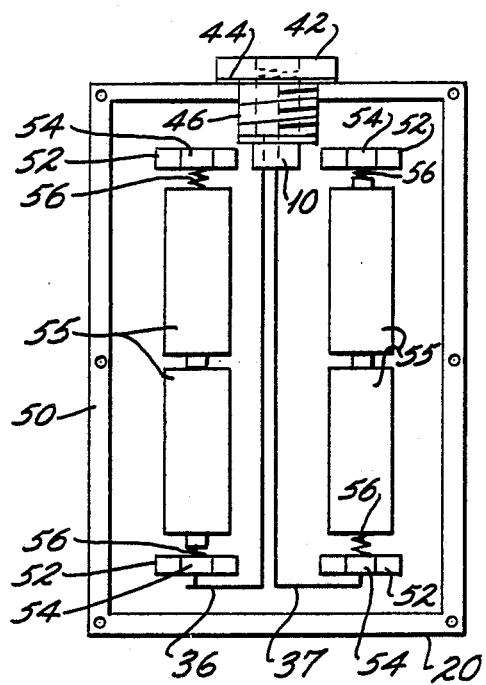
Figure 5:
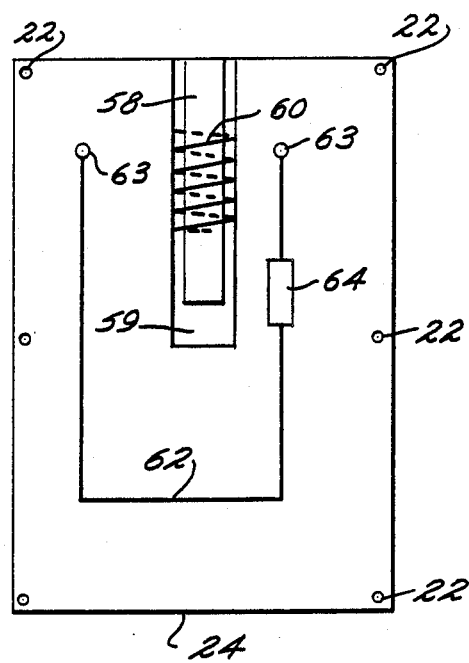
Figure 6:
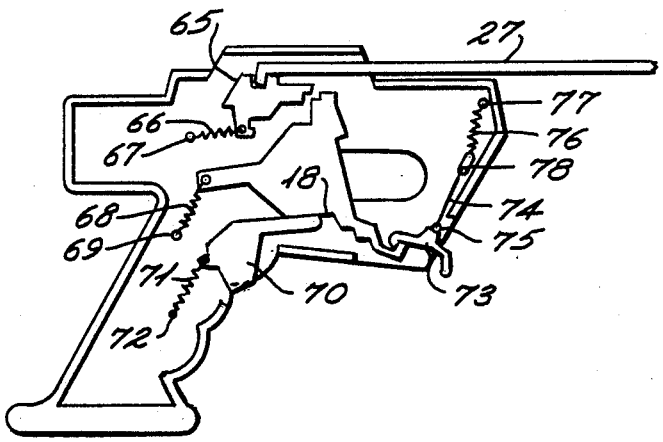

FIG. 1 shows a side view of the speargun.
FIG. 2 shows a front view of the speargun.
FIG. 3 shows side cut-away view of the speargun.
FIG. 4 shows the top view of the bottom half of the battery pak.
FIG. 5 shows the top view of the top half of the battery pak.
FIG. 6 shows the inside of the handle.

FIG. 1 shows the side view of the speargun having a barrel (8), preferably made of aluminum. The lens (4) of the light assembly (6) is secured by four fastners (2). The front receiver (28) holds two elastic bands (30) in place to be secured against notches in the spear (27). The line retainer (5) secures ones end of the line (7) to the barrel (8) while the line (7) is wrapped around the line release (73) an secured to a line retainer spring (79) that slips over the spear (27). The speargun barrel (8) is cut away to show the wire housing (10) running inside the speargun barrel (8) from the light assembly (6) to the battery pak bottom (20). The light switch (12) is attached by two fasteners (13) to a switch rod (14) which goes back to the battery pak (24). The light switch (12) is located near the speargun handle (16) and the trigger (18). The battery pak lid (24) is secured to the battery pak bottom (20) by six fasteners (22). The gun butt (26) completes the end of the speargun.

FIG. 2 shows the front view of the speargun focusing in on the front of the light. Four fasteners (2) that have o-rings (3) on them secure the lens plate (4) to the light assembly (6). A reflector o-ring (33) further insures a waterproof seal around the reflector (32) to the lens plate (4). The bulb (35) is surrounded by a brass connector (34) at its base. The relation between the light and the front receiver (28) where the spear (27) shoots out of is apparent in this view. The light projects out to where the spear (27) is aiming for. The front receiver (28) holds the elastic bands (30) from interferring with the light assembly (6). The contoured spear track (9) ensures the spear (27) travels out of the speargun straight.

FIG. 3 shows the side cut away view of the light components. The lens plate (4) is secured by four fasteners (2). The interior of the light assembly (6) is contoured to receive the reflector (32). The bulb (35) is set into a brass connector (34) with a spring (38) inside it and also another spring (39) on its bottom end. This is set into the reflector (32). The positive wire (36) is soldered to the inside of the brass connector (34). The negative wire (37) is soldered to the outside of the brass connector (34). The positive wire (36) and the negative wire (37) are then encased in a wire housing (10). The wire housing (10), preferably made of a reinforced plastic, protects the wires and also makes a watertight covering. A wire housing o-ring (11) is placed between the wire housing (10) and the light assembly plug (40). A light assembly plug (40) which has a o-ring (41) on its stem secures the wire housing (10) to the light assembly (6). This forms a watertight seal.

FIG. 4 shows the bottom half of the battery pak (20). The wire housing (10) travels through the battery pak connector (42). The battery pak connector (42) has an o-ring (44) on its threaded stem to make a watertight seal between the connector (42) and the battery pak bottom (20). Another o-ring (46) is placed between the connector (42) and the wire housing (10) for another watertight seal. The bottom of the batter pak (20) has a large o-ring (50) to make the battery pak (20) and (24) watertight. The positive wire (36) runs down the right side of the battery pak bottom (20) to a battery post (54). The battery post (54) is set into a post insulator (52). The negative wire (37) runs down the left side of the battery pak bottom (20) to another battery post (54). A battery spring (56) fitted next to the inside of the battery post positions one battery (55) against another battery (55) to another battery spring (56) to another battery post (54) set into another post insulator (52). Two more batteries (55) are positioned identically on the other side of the battery pak (20).

FIG. 5 shows the battery pak lid. Fasteners (22) fit through holes in the battery pak lid (24). A magnetic rod (58) fits into a contoured slot (59) in the battery pak lid (24). A rod spring (60) is fitted over the magnetic rod (58). There is a wire post (63) from which a wire (62) follows the inside contours of the battery park lid (24) around to a reed switch (64) and then back again to another wire post (63).

FIG. 6 is a inside view of the handle assembly. The sear (65) is configured to accept the downturned notch of the spear (27). The sear (65) is secured to a sear spring (66) which connects to a sear post (67). The sear (65) rotates in relation to the trigger (18). The trigger (18) is secured by a trigger spring (68) to a trigger spring post (69). The safety (70) blocks movement of the trigger (18) unless the trigger (18) and the safety (70) are squeezed simultaneously. The safety (70) is secured by a safety spring (71) to a safety spring post (72). A line release (73) rotates to a relase position when the trigger (18) is pulled back. The line release (73) moves back in position due to the line release tension line (74) with its tension line ball (75) fitting into the line release (73). The line release tension line (74) has a loop on it other end secured by a line release fastner (78). The loop is attached to a line release spring (76) to a spring post (77).

These descriptions are not meant to limit the scope of this invention, but merely suggest examples. Numerous changes may be made which will readily suggest themselves to those skilled in the art and are encompassed in the spirit of this invention as disclosed and defined in these claims.

We claim:

1. A light projecting speargun comprising:
   an elongated tubular barrel having a forward end, a rear end, an upper spear support means, a hollow hand grip attached intermediate the rear end of said barrel, a pivotally attached trigger means located inside said hand grip, a pivotally attached sear means engaging said trigger means, a spear means for slidably engaging said spear support means, said spear means having one of its ends for releaseably engaging said sear means and further having at one said end, means for releaseably attaching sear propelling means; a safety means for automatically locking said trigger and sear means and to release said sear means when said trigger and safety means are simultaneously activated, said sear propelling means being elastic means attached to and stretched from the forward end of said barrel and attached to said spear means at one end, a light projecting means attached inside the forward end of said barrel, said light projecting means sealed in a watertight case, a power source means, an elongated wire means connecting said light projecting means to said power source, an elongated holder means protecting said wire means from breakage and environmental exposure, a switch means to activate said light projecting means on and off.

2. A light projecting speargun of claim 1 further comprising:
   a magnetic switch means to activate power from said power source means to said light projecting means.

3. A light projecting speargun of claim 2 wherein said power source means is a plurality of batteries.

4. A light projecting speargun of claim 3 wherein said elongated tubular barrel is made of alluminum.

5. A light projecting speargun of claim 4 wherein said alluminum elongated tubular barrel is substantially square in shape.

6. A light projecting speargun of claim 5 wherein said elongated holder means is made of reinforced plastic tubing.

* * * * *